United States Patent [19]
Muller et al.

[11] Patent Number: 5,489,817
[45] Date of Patent: Feb. 6, 1996

[54] ELECTRON-OPTICAL TERMINAL IMAGE DEVICE BASED ON A COLD CATHODE

[75] Inventors: Gerd O. Muller; Regina Muller-Mach, both of Berlin, Germany

[73] Assignee: Scitex Corporation Ltd., Herzliya, Israel

[21] Appl. No.: 137,030

[22] PCT Filed: Apr. 15, 1992

[86] PCT No.: PCT/DE92/00313

§ 371 Date: Mar. 31, 1994

§ 102(e) Date: Mar. 31, 1994

[87] PCT Pub. No.: WO92/19005

PCT Pub. Date: Apr. 15, 1992

[30] Foreign Application Priority Data

Apr. 19, 1991 [DE] Germany .................. 41 13 274.2
Apr. 19, 1991 [DE] Germany .................. 41 13 275.0
Apr. 19, 1991 [DE] Germany .................. 41 13 276.9

[51] Int. Cl.[6] ............................................. H01J 29/08
[52] U.S. Cl. .................. 313/495; 313/497; 313/500; 313/505; 313/512; 313/525; 313/539; 345/75; 345/905; 378/121
[58] Field of Search ..................... 313/495, 496, 313/497, 499, 500, 505, 512, 525, 539, 542, 543, 544; 345/75, 905; 378/121, 122, 138; 257/10

[56] References Cited

U.S. PATENT DOCUMENTS

| | | | |
|---|---|---|---|
| 3,575,628 | 4/1971 | Word | 313/525 |
| 4,019,809 | 4/1977 | Otake et al. | 313/525 X |
| 4,536,679 | 8/1985 | Guittard et al. | 313/544 X |
| 4,884,010 | 11/1989 | Biberian | 313/309 X |
| 4,908,539 | 3/1990 | Meyer | 315/169.4 X |
| 5,278,544 | 1/1994 | Leroux | 313/495 X |

*Primary Examiner*—Sandra L. O'Shea
*Assistant Examiner*—Ashok Patel
*Attorney, Agent, or Firm*—Mark M. Friedman

[57] ABSTRACT

A cold cathode (3) in the form of a solid thin film component is the basis for electron-optical terminal image devices. The thin-film structure is made up of a base electrode (5), e.g., in the form of a bundle of parallel strips, an insulating film (6), a semiconductor film (7) and a covering electrode (8), e.g., also a bundle of parallel strips but running perpendicularly to the base electrode (5) bundle. This set of layers borne on a substrate plate (4), is in an evacuated casing (2) and is opposite a fluorescent screen (12) or a light emitter (15), the metalized coating (11) of which forms the counter-pole for the electron acceleration chamber (9). The main applications of such electron-optical terminal image devices are embodiments as matrix-addressed flat displays, image converters or write/read lines.

5 Claims, 2 Drawing Sheets

ELECTRON-OPTICAL TERMINAL IMAGE DEVICE BASED ON A COLD CATHODE

FIELD OF TECHNOLOGY

The invention concerns an electron-optical image terminal device based on an air-tight vacuum envelope containing a solid-state thin layer element that serves as electron source—the cold cathode—in which the electron emitting region consists of a stack made up of a metal layer that serves as the ground electrode, an insulator film, a semiconductor film and finally another thin metal layer as covering electrode, this stack residing on a non-conducting substrate, plus an electron acceleration space, likewise enclosed within the vacuum envelope.

STATE OF THE ART

The state of the art, which serves as the starting point of the invention, is contained in the publication "Direct Evidence of Ballistic Acceleration of Electrons in ZnS" by G. O. Muller, R. Mach, E. Halden, a paper presented at "The 20th International Conference on The Physics of Semiconductors", Aug. 6–10, 1990, Thessaloniki, Greece (see proceedings 20th ICPS, October 1990, vol. 3, pp. 2510–2513). This paper reports on the results of research on MISM-structures (Metal-Insulator-Semiconductor-Metal) serving as sources of "hot" electrons for electron-optical applications. This work is concerned with a cold cathode, although the authors do not refer to it explicitly as such. Later papers adopt the acronym "HECC" (Hot Electron Cold Cathode) for this arrangement.

This development opens a new way for a variety of applications of electron-optical systems. The efforts that have been undertaken to replace conventional cathode-ray tubes by display devices of better configuration, in particular having a smaller ratio of depth to the useful screen area, have led to the construction of so-called flat panel cathode ray tubes (flat-CRT) employing a variety of working principles, such as hybrid plasma display/CRT and true flat panel displays, in particular liquid crystal, plasma and electroluminescent displays. A sort of intermediate position is occupied by the so-called vacuum fluorescent displays, in which electrons are emitted from a multiplicity of hot cathodes and accelerated through a multiplicity of control grids to impinge on layers of fluorescent material.

Electrons in cathode-ray tubes are driven to relatively high kinetic energy (5 keV up to 30 keV) required for efficient generation of light in fluorescent materials, whereby high brightness is obtainable if the fluorescence efficiency is adequate. The principle of emission of these electrons from one or a few hot cathodes makes it necessary, however, to provide a deflection system and it is this system that causes the considerable tube depth, or in the case of flat-CRT's requires a complicated construction or technology, and on the other hand forces the dwell-time of the electron beam on each individual pixel to grow shorter, the higher the resolution. The latter circumstance makes it difficult to attain high brightness, since the energy input per pixel and frame cycle is given by the product of beam power and dwell time.

The patent DE-OS 34 32 377 does already describe a flat display device in which an array of thin-layer MIM (Metal-Insulator-Metal) cathodes serve as the electron source. By depositing a sub-atomic thin layer of an electro-positive adsorbate, such as Cs, electron scattering in the covering metal of the cathodes could be reduced. This additional deposited layer leads to instabilities, however, due to redistribution that takes place during operation.

Image converters find application as devices that make visible on a fluorescent screen UV or X-ray images incident on the photo-cathode. Many image converters of conventional construction suffer from the drawback of undesirable phenomena due to back-coupling of the light from the screen with the photo-cathode, from complicated dependence of the electron-optical image formation on the energy with which the photo-electrons are emitted from the cathode, or by the fact that the quantum efficiency of the photo-emission is as a rule much lower than 1, so that weak primary images may only be incompletely reproduced on the display screen.

In a laser printer, a device producing high quality hard copies, the optical information for the printing process is written onto the print drum by a laser beam which has its intensity modulated, or switched on and off, while being driven at the same time along the periphery of the print drum, for example by a rotating polygonal mirror. This manner of operation suffers in principle from the disadvantage that the information input takes place serially within each line, so that if the speed is increased the intensity must also be made higher, in order to supply the required light energy per pixel. Moreover, the deflection device, such as a polygonal mirror, is expensive and liable to considerable wear, which mainly affects its bearings. Relatively complex assembly and maintenance procedures for the optics increase the manufacturing costs.

Linear arrays of spot-emitters, composed for example of light-emitting diodes (LED) are also well known. These permit the entire optical information to be simultaneously generated and written onto the print drum. Such LED linear arrays are costly, however, since they have to be assembled from short sections, and have the added disadvantage of the large emission angle characteristic of LED's, so that a relay optic is required.

Another solution to the problem of generating the entire optical information and writing it onto the print drum is described in "Proceedings of the SID", Vol. 29/2, 1988, pp. 147–150, as well as in "Solid State Technology" July 1988, pp. 77–79. The basic idea of an edge-emitter used there involves a MISIM-structure(Metal-Insulator-Semiconductor-Insulator-Metal) within the active semiconductor layer, which generates light under the action of an applied AC or bipolar pulsed voltage, whereby only a small part of this light is radiated through a transparent electrode perpendicular to the glass substrate, while most of it is trapped and guided in the plane of the MISIM film. The reason for this is the high refractive index of the active semiconductor film. There is, however, as yet no technical solution employing the basic approach of an edge-emitter.

DESCRIPTION OF THE INVENTION

The technical problem to which this invention is addressed essentially consists in constructing a cold cathode as a solid state thin-film element which to provide electron-optical image terminal devices with stable operation at high cathode output and avoid the drawbacks of conventional electron-optical devices, without giving up their trusted desirable features. In addition, such a solid state thin-film element, with all the details of its various modifications of construction, should be possible to manufacture using present-day mature technologies. According to the invention, this problem is solved for image terminal devices of the types listed in the introduction by configuring the electron emitting region as a multiplicity of selectively controllable cathode spots and thinning down the covering electrode over each such cathode spot to no more than 40 nm.

A raster scan, commonly used for alpha-numeric as well as for graphic displays, in the reproduction of television images and the like, would be realized by those selectively controllable cathode spots. Emission of electrons would only be made possible at the cathode spots, and nowhere else: electrical connections to the cover electrode between individual cathode spots or from these spots outwards would only have to comply with electrical requirements, which they must fulfill very well; they must also be mechanically stable. The functionality of cold cathodes according to the invention therefore essentially depends on the construction of the cover electrode and the associated cathode spots.

Image terminal devices according to the invention that are intended for specific applications have special configurations.

The first configuration as flat display panel has an array-addressable cold cathode, an electron acceleration space, a fluorescent screen and an airtight vacuum envelope, whereby the geometrical extension of the array-addressable cold cathode corresponds to that of the fluorescent screen and each cathode spot is paired with one screen pixel, and the array-addressable cold cathode is made up of a MISM-stack on a non-conducting substrate plate, this stack consisting of a layer of parallel stripes that constitute the ground electrode and serve as rows, then an insulating film, a semiconductor film and another layer of parallel stripes constituting the cover electrode which run perpendicular to the ground-electrode rows, these cover-electrode stripes serving as column electrodes, and whereby the column electrodes of the cover are thinned down at least in part of each geometrical intersection of the column stripes with the row stripes—these intersections forming the cathode spots.

Further improvements of such a flat display panel have the display screen provided with a metallic cover layer on its side facing the cold cathode, or provided with an optically transparent conductive layer on its side facing away from the cold cathode.

The semi-conductor film of the cold cathode is to consist preferably of ZnS or CdS or ZnSe or SrS or CaS or a mixed composite of these materials. For the cover electrode, at least in the thinned down regions, gold has been found to be a suitable material, as well as zinc, and for the ground electrode chromium.

In such a flat display panel, the electrons emitted by each cathode spot are accelerated in a straight line towards its corresponding pixel. The individual cathode spots are array-addressed, similarly to the addressing of conventional flat panel displays (plasma or electro-luminescent displays). This is done usually by time-sequential row selection by a pulse, for example of negative polarity, and a simultaneous application of a positive pulse to all columns from the intersections of which with the selected row electrons are to be emitted. The material used for the semi-conductor film is of such nature as to allow loss-free acceleration of electrons within it in the presence of a sufficiently high electric field, these electrons being emitted from surface-states on the interface with the insulator film by tunnelling, as soon as the applied field exceeds a threshold value. The cover electrode column stripes are thinned down at the intersection regions with the ground electrode row stripes, in order to make them transparent, that is, to allow loss-free passage of the accelerated electrons.

In flat panel displays according to the invention, the electrons are emitted from the MISM cathode without any heating. These electrons are next accelerated by the electric field applied between the entire system of the cover electrodes and the metallic cover layer of the fluorescent screen, penetrate the latter layer and excite the fluorescent material. The electric field strength is of the order of $10^4$ V/cm (for example, 10 kV across 1 cm distance between cathode and screen) which guarantees very straight trajectories of the electrons from the cathode spot from which they are emitted to the pixel they finally excite.

The advantage over an electro-luminescent display consists in that the electrons accelerated in the semiconductor layer can be driven, once they are emitted into the vacuum, to kinetic energies exceeding 100 up to 1000 fold of their energies within the semiconductor, which energy they give up to any desirable assortment of sophisticated phosphors with which the screen is coated. In this way the color of the emitted light depends only on the choice of phosphor, whereas the brightness can be adjusted over a wide range by suitable choice of the accelerating voltage.

A flat panel display constructed according to the invention makes possible stable operation at high cathode output, and by avoiding beam forming and deflection devices, greatly simplifies the construction and technology of flat display panels.

In another configuration, as image converter for UV and X-ray images, a photo-cathode, an acceleration space, and a fluorescent screen parallel to the photo-cathode are contained in an air tight vacuum envelope, whereby the photo-cathode and fluorescent screen are positioned in close proximity, and the photo-cathode which is built up on a non-conducting substrate which is sufficiently transparent to UV and X-ray radiation, is a thin-film stack that consists of ground electrode film that slightly absorbs the primary image-forming radiation, an insulator film, a semiconductor film and a cover electrode film, so that the pixels of the primary image consist of these thinned-down local regions in the cover electrode film at which the ground and cover electrode stripes intersect and opposite which a large area electric contact is provided on the fluorescent screen. The last-mentioned configuration of the invention also permits stable operation at high beam power and simplified electron-optical image formation. In addition, previously existing electronic information can be displayed in a simple manner on the same screen as the converted UV or X-ray image.

The photo-cathode and fluorescent screen lie parallel to one another a short distance apart, preferably 8 mm to 25 mm, within the airtight vacuum envelope.

A preferred improved version of this kind of image converter may have the ground and cover electrodes either in continuous coverage or alternatively as a system of stripe electrodes. The stripe electrode systems of the ground and cover electrodes are perpendicular to one another (rows and columns). In the case of continuous ground and cover electrodes, the cathode spots consist at each point of the regions on which the primary UV or X-ray radiation impinges. Another provision is that the large-area electric contact on the fluorescent screen is formed by a metallic cover layer on the side facing the photo-cathode or consists of a transparent highly conducting layer between the side facing away from the photo-cathode and the glass or fused quart substrate of the fluorescent screen.

In this configuration, too, the semiconductor film of an image terminal device according to the invention consists of ZnS or CdS or ZnSe or SrS or CaS or composite mixtures thereof; as substrate material for the photo-cathode fused quart is to be preferred, while the ground electrode film is preferably aluminum.

The semiconductor film within the photo-cathode stack consists of a material that allows loss-free acceleration of electrons above a critical or threshold field strength. The loss-free acceleration of electrons in such semiconductors causes an avalanche multiplication of photo-electrons, emitted as a result of the absorption of the primary image photons incident on the cathode. Upon application of voltage of the proper polarity—positive on the cover electrode—these electrons are accelerated toward that electrode and reach it with kinetic energies in the range between 1 eV and 10 eV. At those areas where the cover electrode is thinned down to no more than 40 nm, these electrons emerge into the vacuum. On account of the avalanche effect each original photo-electron may thus give rise to several million electrons that reach the inner interface of the cover electrode; if the electron transmittance through the thinned-down areas amounts to about 0.1%, the electron gain would be several thousandfold. The operating voltage between the ground and cover electrodes is chosen considerably below that limiting voltage up to which there is still no electron emission without incident light, that is, no perceptible brightness would appear on the fluorescent screen. The acceleration space provided for the electrons emerging from the photo-cathode is so configured, that a voltage of about 10 kV to 30 kV may be applied between the stripe electrodes and the large-area electrical contact of the fluorescent screen.

For the purpose of simultaneous or time-separated writing of electronic information on the screen, it is necessary to have the ground and cover electrodes configured as row and column stripes, and the cover electrode must be thinned down at least over some of the area of the geometrical intersection of each column electrode with each row electrode. The pixel thus defined will light up whenever the aforementioned limiting voltage is exceeded by the sum of the row and column voltages applied. In practice electronic writing can be carried out in the manner familiar for array displays of "one row at a time".

Such an image converter for UV and X-ray images precludes any back-coupling, and by strictly pairing off photo-cathode pixels with screen pixels through straight trajectories of the electrons it considerably simplifies electron-optical image formation.

In a third configuration the device serves as write and read linear array for photo-printers or scanners. In this configuration the cold cathode and a light emitter placed a small distance from it are contained in an airtight vacuum envelope, the space between the cold cathode and the light emitter serving as acceleration space for the electrons, whereby the cold cathode is built up on an insulator substrate as a MISM thin-film stack, consisting of a metallic ground electrode, insulator film, semiconductor film and a metallic stripe serving as cover electrode which lies perpendicular to the long dimension of the ground electrode, which cover-electrode stripe is thinned down at its intersection with the ground electrode, and whereby an electrode is provided either on the side of the light emitter facing the cold cathode or on the side facing away from it.

This configuration of the invention is of small volume, does not suffer from the disadvantages of existing TFEL (Thin Film Electro-Luminescent) edge-emitters, has sufficient brightness, is readily controllable and can have all pixels either simultaneously or sequentially activated.

Within the MISM stack on the insulating substrate, with the metallic ground electrode and the metallic cover electrode, one of these electrodes is formed as an electron-penetrable stripe, while the other consists of a family of stripes. The thinned-down cathode spots are located at the intersections of the ground and cover electrodes. The form of the thinned-down regions in the cover electrode can be chosen at will. Within the enclosed acceleration space, the electrons emerging from the thinned-down regions of the cover electrode are accelerated by the high ambient electric feed towards the light emitter, and upon striking it excite it to luminescence. The electrode for the accelerating voltage is provided either on the side of the light emitter that faces the cold cathode, or on the side facing away from it. Such a read or write linear array—as compared with the flat display panel configuration—has just one element, that is, one MISM thin-layer stack with just one cover electrode stripe.

In this configuration of an image terminal device according to the invention the photo-conductor film of the photo-cathode again consists of ZnS or CdS or ZnSe or SrS or CaS or a composite mixture of these materials. The cold cathode and/or the light emitter may advantageously be constructed as integral parts of the vacuum envelope.

In case the light emitter has sufficiently high electric conductivity, it is not necessary to provide a special electrode in order to apply the accelerating voltage and its function can be fulfilled by the light emitter itself.

Further, particularly advantageous configurations of such write/read linear arrays have the light emitter enclosed between two parallel reflective surfaces, constituting a resonator for the luminescence radiation so that the active medium lases. Depending on the configuration of the vacuum envelope, the light emitter, consisting either of powdered fluorescent material or of a polycrystaline optical by homogeneous film or of a single-crystal film, radiates the light generated essentially without any optical attenuation either in the direction of acceleration of the electrons or perpendicular to that direction.

In other realizations of write/read linear arrays according to the invention the light emitter may be dotted in the direction of the array with various different materials, or be constructed from different materials that emit light in various colors. The cathode is operated by applying an AC voltage simultaneously or sequentially to its spots, which suffices for loss-free acceleration of electrons found within the semi-conductor film or entering it by tunneling from the interface with the insulator film. These electrons cause an avalanche breakdown in the semi-conductor film, which is charge-limited by the capacity of the insulator film, and assume an energy distribution centered about an energy between 4 eV and 12 eV. According to the polarity of the applied AC or bipolar voltage pulse, these electrons emerge from the thinned-down regions of the cover electrode into the vacuum, when the cover electrode is positive. The intensity of electron emission and thus the brightness generated at the spot of the light emitter lying opposite the corresponding spot of the cover electrode is controlled by the amplitude or the frequency or the pulse length of the applied voltage. The accelerating voltage is applied between the cover electrode of the cathode and the electrode of the light emitter. Such a write/read linear array, having a brightness which is both sufficient and readily controlled, can provide any desirable radiation, such as a uniform output, for example, without technically complicated or unwieldy and costly optical constructions.

BRIEF DESCRIPTION OF THE DRAWINGS

The drawings show schematically essential details of the invention and its preferred realizations, as follows.

These and other structural details are more closely described in the following.

MANNER OF CONSTRUCTION OF THE INVENTION

Figure 1:
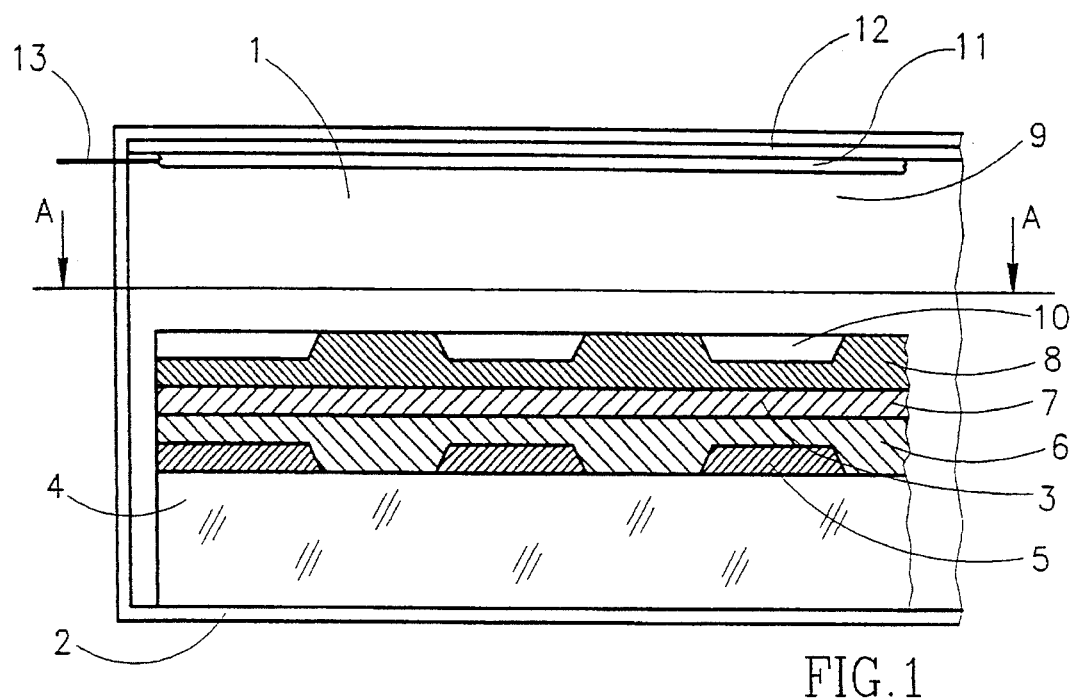
FIG. 1: structure of an electron-optical image terminal device based on a cold cathode in cross section.

FIG. 1 shows the construction of an electron-optical image terminal device 1 which contains a solid state thin-film element 3, hereinafter briefly referred to as the "cold cathode", contained in an airtight vacuum envelope 2, the said thin-film element 3 consisting of a substrate plate 4 and a thin-film stack built up on that substrate, which consists of the ground electrode 5, the insulator film 6, the semiconductor film 7 and the cover electrode 8. An electron acceleration space 9 extends between the cover electrode 8 and a metallic cover layer 11 on the fluorescent screen 12. The ground electrode 5 and the cover electrode 8 each consist of at least one stripe, these stripes lying in mutually perpendicular directions. In the third spatial direction intersection regions are thus formed, which emit electrons and are referred to as the cathode spots pen. The cover electrode 8 is thinned down at each cathode spot 10 to no more than 40 nm. The cathode spots 10 may be selectively activated.

Figure 2:
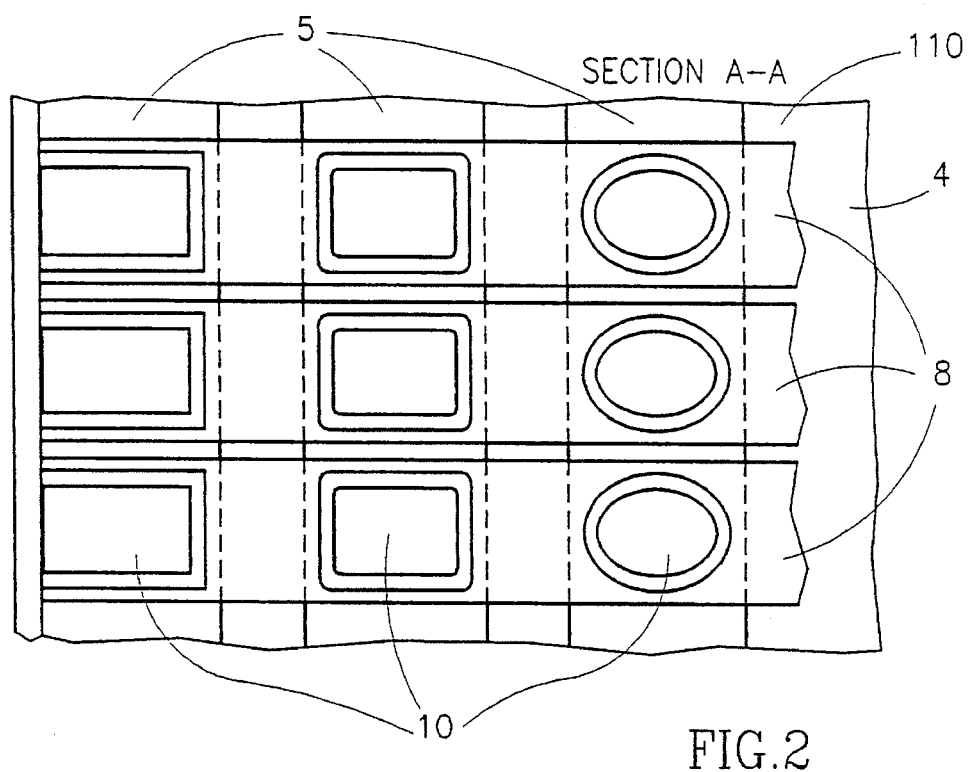
FIG. 2: section of the cold cathode of a flat panel display, seen from above.

FIG. 2 indicates how an image terminal device according to FIG. 1 may be configured as a flat panel display 110. For the reference numbers not given in FIG. 2, see FIG. 1.

A family of parallel chromium stripes belonging to the ground electrode 5 is deposited by usual methods on the glass substrate 4, to form the rows. On top of them—compare FIG. 1—an insulating film 6 is deposited, consisting for example of aluminum oxide or tantalum oxide or a ferroelectric and forming a layer of such thickness that the capacity of this film lies between 10 nF/cm$^2$ and 30 nF/cm$^2$. The ZnS semiconductor film 7, 1000 nm thick, is next deposited. Another family of parallel stripes forming the cover electrode 8, shown in FIG. 2, form the columns and overlie the ZnS semiconductor of film 7, running perpendicular to the rows. A part of each geometrical intersection region of the two stripe electrode families is thinned down by photo-lithographic means. These are the cathode spots 10, which are shown in three different configurations, by way of illustration. In a full-color flat panel display 110, dots emitting in the three fundamental colors R, G, B can also be represented.

The cold cathode 3 is enclosed in the airtight vacuum envelope 2, which contains a flat fluorescent screen positioned at a distance of about 10 mm from the cathode plate. This screen has on its side facing the cold cathode 3 an aluminum cover layer 11 about 20 nm thick. A lead 13 passing through the vacuum envelope is connected to the cover layer 11 and permits the application of a voltage of about +20 kV relative to the mean potential of the electrodes of the cold cathode 3.

Depending on whether a monochrome or color image is to be generated, different constructions of the fluorescent screen 12 are used and the activation of the cold cathode 3 is also organized differently. In the case of a monochrome display 110, the screen 12 consists of just one fluorescent material, which emits in the color desired and for the sake of contrast improvement may be provided with lateral intermittent black material (so-called black matrix) in geometrical correspondence to the lines of separation between the stripes of the cover electrode 8. In case of a full-color display 110, the fluorescent screen 12 consists of periodically alternating color stripes, geometrically corresponding to the columns of the cold cathode 3, each of another fundamental color, for example, red, green, blue (RGB) which are made up of suitably emitting fluorescent materials. The cathode columns geometrically corresponding to each of the fundamental color stripes are activated by the signals corresponding to that fundamental color. A black matrix may also be included, as in the monochrome realization, in the positions of the screen 12 that correspond to the lines of separation between the stripes of the cover electrode 8.

Figure 3:
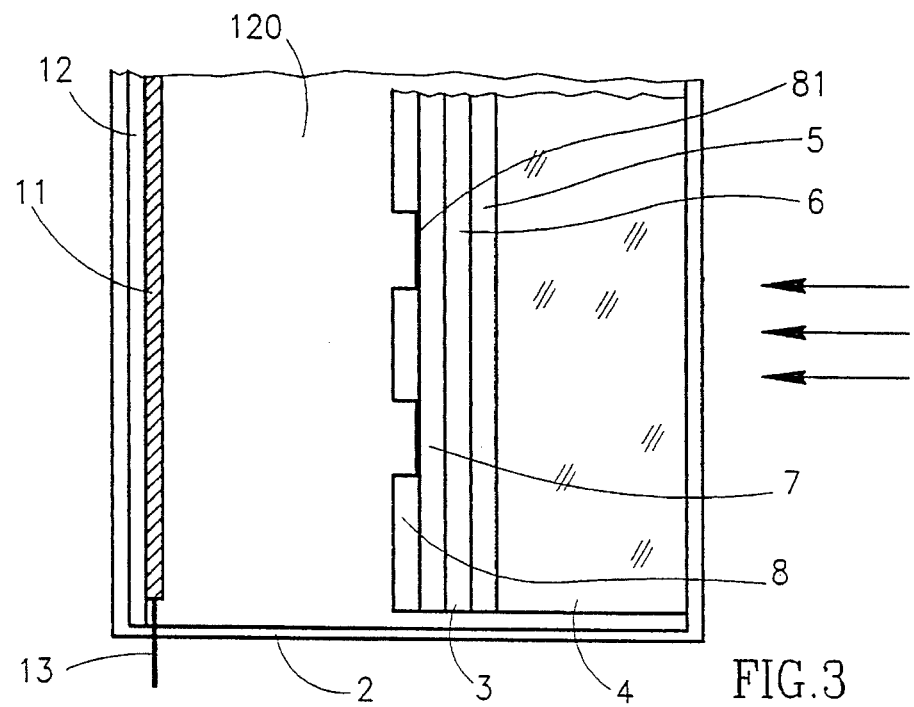
FIG. 3: structure of an image converter in cross section.

FIG. 3 shows the construction of an image converter 120, in which the substrate is a fused quarts plate 4, on which a visible and UV transparent, electrically conducting layer about 200 nm thick of indium-tin oxide (ITO) is deposited, preserving lateral uniformity, to serve as the ground electrode 5. On top of this ground electrode 5 is deposited the insulating film 6 of aluminum oxide, which is about 300 nm thick. The next layer is a ZnS semiconductor film 7 which is about 1000 nm thick. On top of this ZnS film 7 is deposited the cover electrode 8 which is made of gold, for example, and is about 70 nm thick. Depressions are etched into the cover electrode 8 that measure 0.05×0.05 mm, then another gold layer 81 is deposited, of 7 nm thickness. The photo-cathode so constructed is positioned within the airtight vacuum envelope 2 parallel to the fluorescent screen 12 at a distance of 10 mm from it. On the side of the fluorescent screen 12 that faces the cold cathode 3 an aluminum layer 11 is provided of 50 nm thickness. All electric leads 13 are brought out in an airtight manner through the vacuum envelope 2.

In operation of the image converter 120, an AC voltage of about 10 kHz frequency is applied between the ground electrode 5 and the cover electrode 8 of the cold cathode 3. Simultaneously, a DC voltage of a 20 kV is applied between the cover electrode 8 and the aluminum layer 11 of the screen 12, the aluminum layer having positive polarity.

Figure 4:
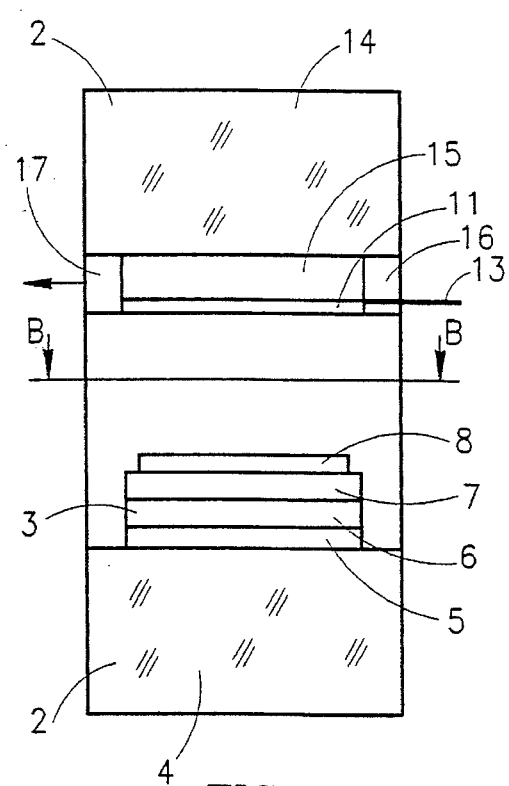
FIG. 4: structure of a write/read linear array in cross section.
Figure 5:
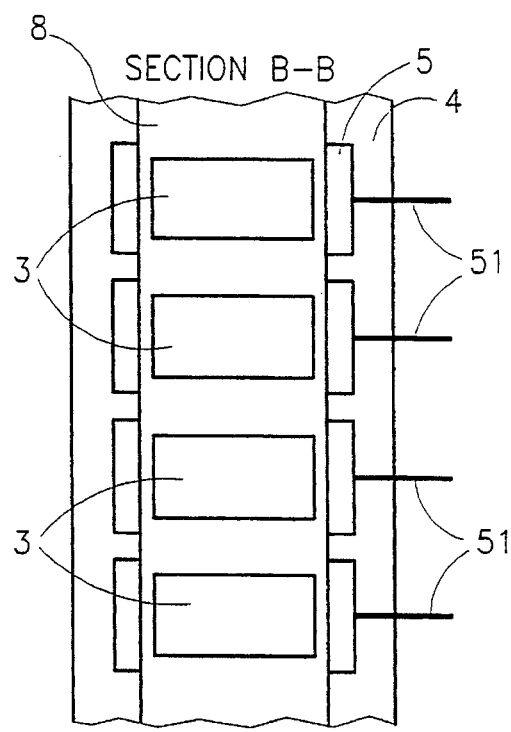
FIG. 5: section of the cold cathode for a write/read linear array according to FIG. 4, seen from above.

FIGS. 4 and 5 describe the configuration as write/read linear array for a photo-printer/scanner.

On the glass substrate 4, which forms part of the vacuum envelope 2, an aluminum ground electrode 5 is deposited, on top of it an insulator film 6 of aluminum oxide about 300 nm thick, and next a layer of about 1000 nm of ZnS which forms the semiconductor film 7. The cover electrode 8 is, for example, a gold film of striped structure about 10 nm thick. The separate stripes of the cover electrode 8 have a width of 0.03 mm and overlap the stripes of the cover electrode 5. Between the individual stripes intervals measuring 0.08 mm remain bare. A current lead 51 is next applied in parallel to each individual stripe of the ground electrode 5, overlapping it over a margin 0.3 mm wide, which current leads are deposited in a subsequent separate evaporation process and consists of an essentially thicker metal layer, and after fritting of the cold cathode 3 into the vacuum envelope 2 these, as well as any other lead to the cover electrode 8 and to the aluminized electrode 11, are brought out through the vacuum envelope and remain accessible from the outside.

The light emitter 15 is prepared on a glass substrate 14 in the form of a conventional fluorescent layer, so that its area is somewhat larger than that needed to cover the ground electrode 5. This is then metalized by a thin aluminum cover layer 11, and after integration in the vacuum envelope 2 a lead 13 to this aluminum layer 11 is brought out. The integration in the vacuum envelope is carried out in such manner, that the light emitter 15 is enclosed between two plane-parallel reflective surfaces (16, 17) and is positioned parallel to the cold cathode 3 at a distance of about 10 mm.

In operation a voltage of about 15 kV is applied between the cover electrode 8 and the metalization 11 of the light emitter 15, having the metalized layer 11 as the positive pole. Between the ground electrode 5 and the separate stripes of the cover electrode 8 AC bursts are successively applied with a frequency of 15 kHz and a burst duration of 0.5 ms. The voltage required for this ranges from 100 V and up to 130 V, according to the brightness desired.

We claim:

1. An image converter device for UV or X-ray images, including an airtight vacuum envelope comprising:
   (a) a multilayered photocathode structure, said structure including a non-conducting substrate substantially transparent to UV or X-ray radiation laminated with the following thin layers in sequence:
      (i) a first conductive layer serving as a ground voltage inducing electrode which is substantially transparent to the UV or X-ray radiation;
      (ii) an insulator film which is substantially transparent to the UV or X-ray radiation;
      (iii) a semi-conductor film; and
      (iv) a second conductive layer serving as a cover electrode including a multiplicity of electron-ejecting cathode spots each having a thickness of no more than 40 nm for allowing a passage of electrons; and
   (b) an anode structure including a fluorescent screen positioned parallel to said cold cathode structure and being separated from said photo-cathode structure by an electron acceleration space.

2. The device according to claim 1, wherein said ground and cover electrodes are continuous.

3. The device according to claim 1, wherein said ground and cover electrodes are configured as mutually perpendicular electrode stripes.

4. The device according to claim 1, wherein said anode structure includes a thin electrode layer deposited on a side of said fluorescent screen which faces said photo-cathode structure.

5. The device according to claim 1, wherein said fluorescent screen includes regions of different fluorescent materials.

* * * * *